Figure 1:
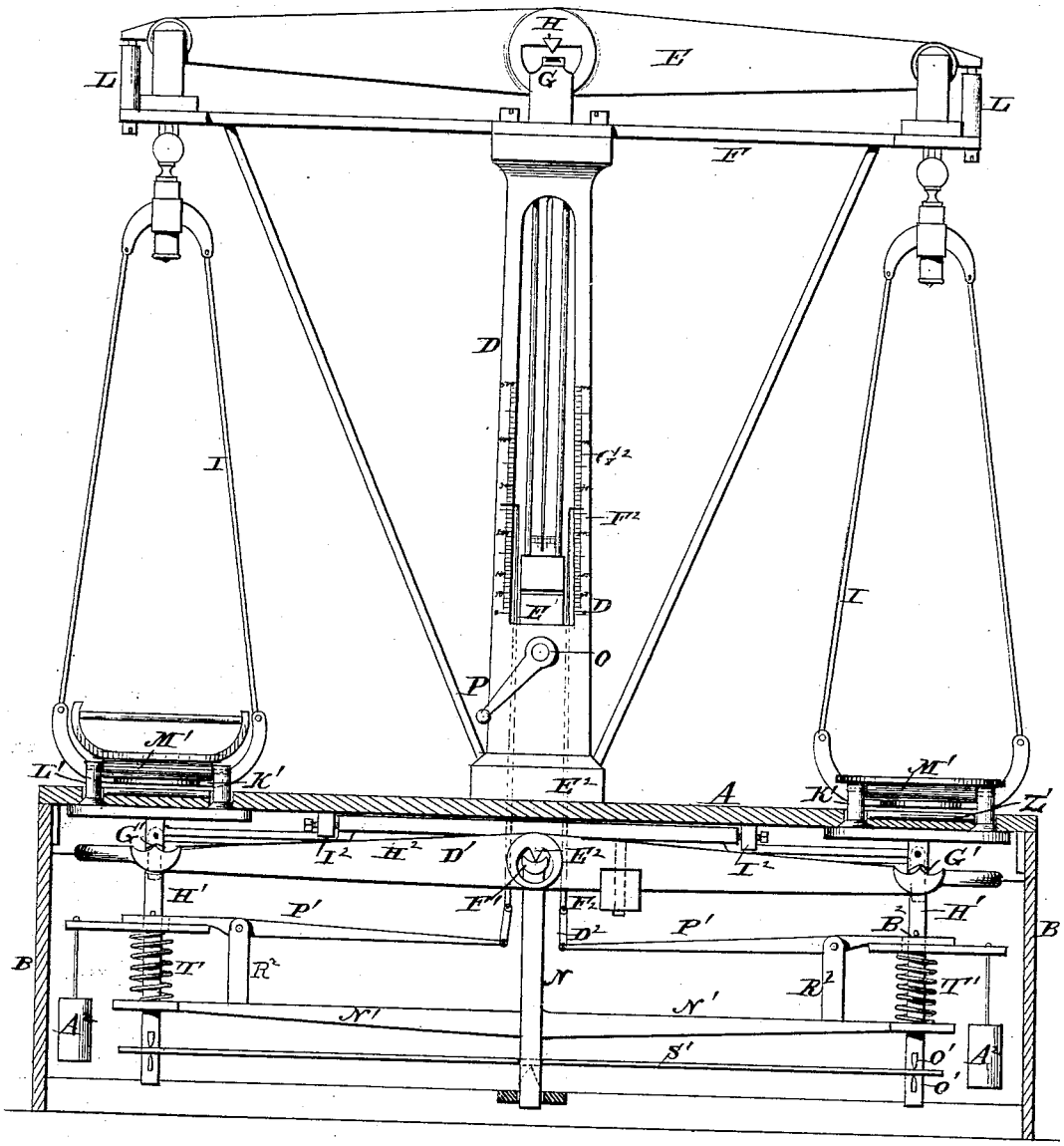

3 Sheets—Sheet 1.

H. S. COCHRAN.
Weighing-Scale.

No. 205,354. Patented June 25, 1878.

Attest:
H. D. Purine.
J. A. Rutherford

Henry S. Cochran
Inventor.
By James L. Norris,
Atty.

N. PETERS, PHOTO-LITHOGRAPHER, WASHINGTON, D. C.

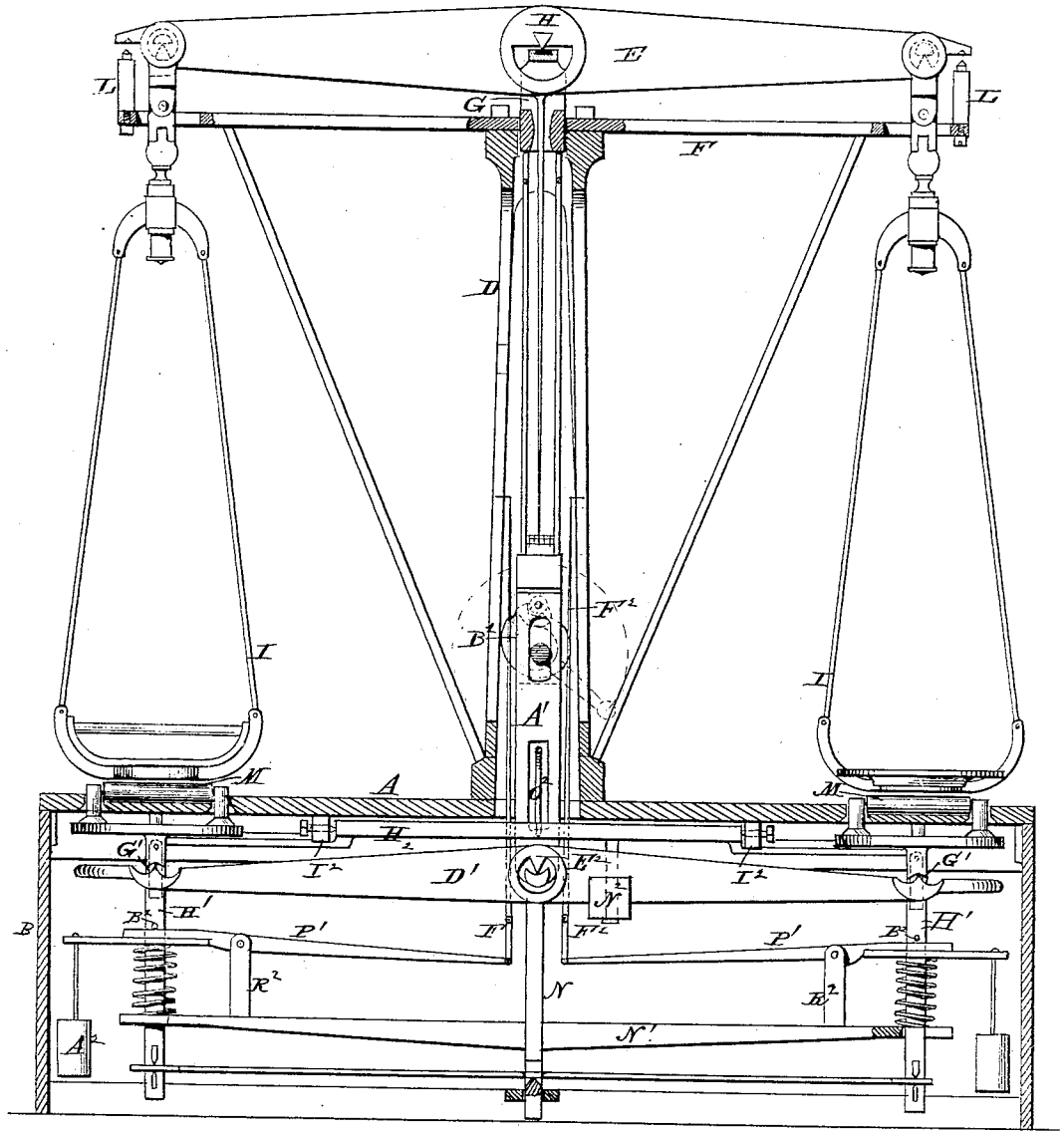

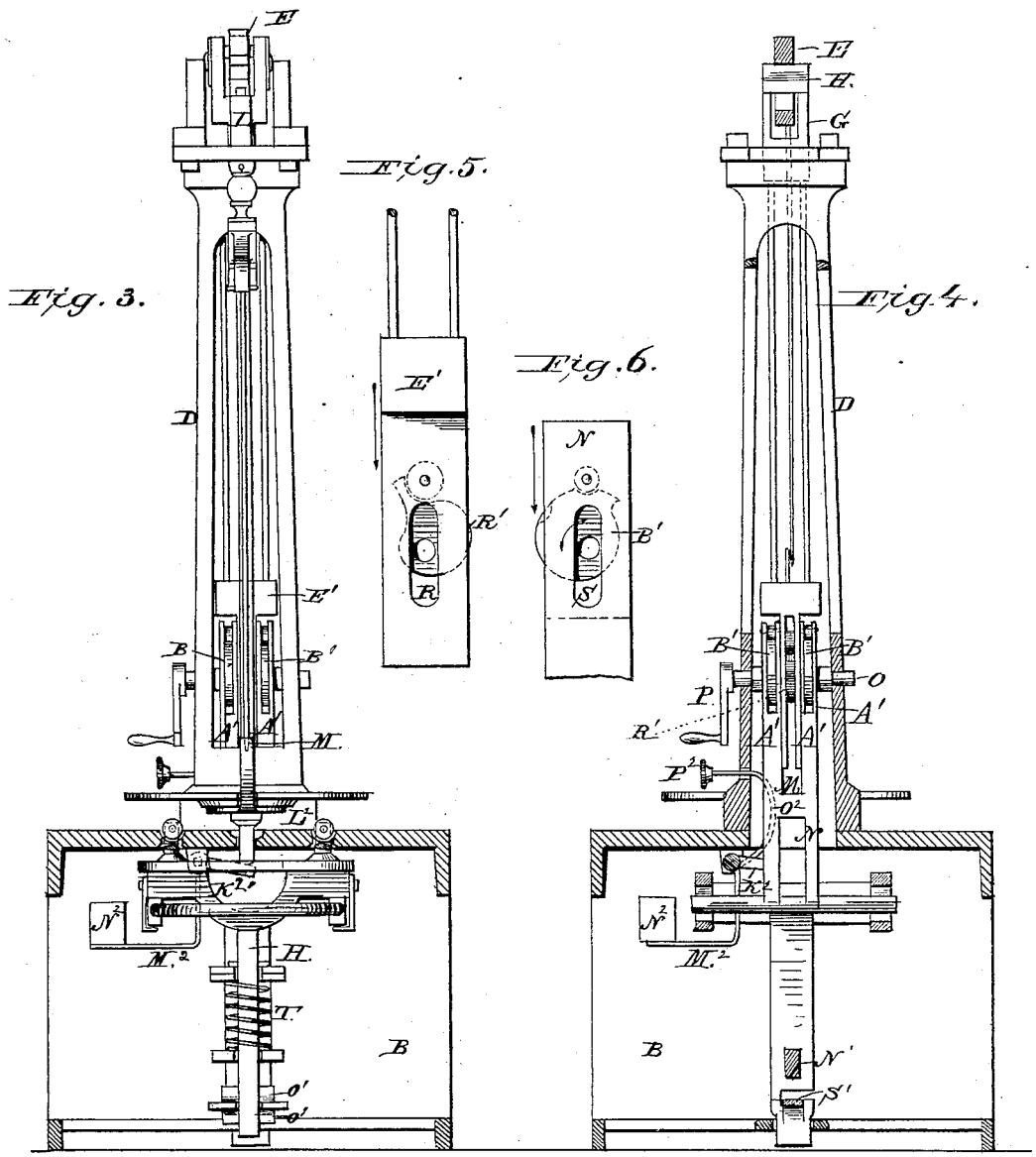

UNITED STATES PATENT OFFICE.

HENRY S. COCHRAN, OF PHILADELPHIA, PENNSYLVANIA.

IMPROVEMENT IN WEIGHING-SCALES.

Specification forming part of Letters Patent No. 205,354, dated June 25, 1878; application filed June 13, 1878.

*To all whom it may concern:*

Be it known that I, HENRY S. COCHRAN, of the city of Philadelphia, in the county of Philadelphia and State of Pennsylvania, have invented certain new and useful Improvements in Scales for Weighing Bullion, Coin, &c., of which the following is a specification:

This invention relates to certain improvements in scales, and is particularly designed for weighing bullion, although it may be employed with advantage for other purposes.

In order to accurately weigh any article or substance, it is absolutely necessary to make use of the scale known as a "beam-scale;" but it has been found impracticable to employ the same in weighing heavy articles or substances, and especially in weighing bullion, owing to the injury to the knife-edges of the beam-scale.

The object of my invention is to obviate said wear and injury to the beam-scale; and to this end it consists in combining with said beam-scale a platform and auxiliary scale below, by means of which the weight of the article or substance may be approximately ascertained before the final accurate weighing on the beam-scale.

My invention further consists in the combination, with the platform-scale, of an auxiliary spring-scale or device, by means of which the weight of the substance or article may be approximately determined previous to weighing on the platform-scale, as more fully hereinafter set forth.

In the drawings, Figure 1 represents a view of my improved scale, partly in side elevation and partly in section, showing the platform-scale in operative position; Fig. 2, a similar view, showing the beam-scale in operative position; Fig. 3, a view, which is partly an end elevation and partly a transverse section, showing both scales in an inoperative position, for the purpose of charging the scale-pan previous to the weighing operation. Fig. 4 represents a central transverse vertical section of my improved scale; Fig. 5, a detached view of the vertically-adjustable standard which carries the beam-scale, and a cam by which it is elevated and lowered to throw the beam-scale into and out of operation; and Fig. 6 a similar view of the vertically-adjustable standard which supports the platform-scale and the mechanism for elevating and lowering the same to throw said scale into and out of operation.

The letter A represents the base or bed of the scale, supported upon a rectangular frame, B. From the center of the bed or base A rises a vertical standard, D, which serves as a support for the beam-scale E and the devices by means of which it is thrown into and out of operation.

The letter $E^1$ represents a vertically-sliding standard, passing at its upper end through the upper part of the standard D and the transverse stationary beam F, attached to the same, and slotted at its upper end and provided with hardened-steel bearings G for the knife-edges H of the beam E. The said beam E is provided at each end with the usual dependants I, carrying at their lower ends the scale-pan seats $K^1$; and the horizontal stationary beam F, attached to the column D, is provided at each end with a vertical standard, L, upon which the ends of the scale-beam E rest when the said beam is thrown out of operation, so as to relieve the knife-edges H of the same of all weight. The sliding standard $E^1$, at its lower end, sits and is adapted to reciprocate vertically in a central slot, M, Figs. 3 and 4, in the upper end of a vertically-sliding standard, N, which supports and carries the working parts of the platform-scale, to be hereinafter more fully described.

The letter O represents a shaft or journal passing transversely through the standard or column D, and provided with a hand-crank, P, on its forward end, by means of which it may be rotated or oscillated. Said shaft or journal also passes transversely through a longitudinal slot, R, in the lower end of the standard $E^1$ and in slots S S in the upper end of the standard N. Said shaft or journal is provided with a cam, $R^1$, sitting in a slot, M, in the lower end of the standard $E^1$, (shown in detail in Fig. 6,) by means of which the said standard $E^1$ is elevated or depressed to throw the beam-scale into and out of operation, as will more fully hereinafter appear.

The standard N, at its upper end and at each side of the central slot M, in which the lower end of the sliding standard $E^1$ is adapted to reciprocate, is provided with slots $A^1$, Figs. 3 and 5, parallel to said slot M; and in said slots A¹, and mounted on the shaft or journal O, are located cams B¹, by means of which the platform-scale is thrown into and out of operation.

The letter D¹ represents the beam of the platform-scale, located below the bed or base A, and provided with central knife-edges E², which sit in bearings F¹ in the sliding standard N. Said beam D¹ is provided at its ends with knife-edges G¹, upon which are seated the transverse arms of the standards H¹. The said beam D¹ is bifurcated at each end, and said ends are provided with bifurcated extensions K¹, said extensions extending through slots L¹ in the base A, and having journaled between their branches friction-rollers M¹, by means of which the scale-pans may be readily removed from position. The lower ends of said standards H¹ are confined between the bifurcated ends of a lever, N¹, fulcrumed in the sliding standard N, by means of the knife-edges O¹, whereby they are kept in proper vertical position as the bearer of the platform-scale is oscillated.

The letter P¹ represents a lever pivoted to a vertical standard, R², secured to a beam, S′, extending horizontally from the standard N. Both the lever P¹ and the beam S′ are slotted at their ends, through which slots one of the upright standards H¹ of the platform-scale passes. Between said slotted ends of the beam and lever, and surrounding the standard, is located a spiral spring, T′, which keeps the said beam and lever normally distended from each other.

The letter A² represents a weight or counterpoise secured to an extension on the lever P′, by means of which the tension of the spring T′ is regulated.

The standard H¹ is provided with a transverse pin, B², which bears against the upper side of the end of the lever P¹. The said lever P¹ has connected to its other end, by means of a link, D², a vertical rod, E², provided with an index, F², which is adapted to traverse a graduated gage, G², upon the upright column D. The spring T′ operates as a balance, by means of which the weight of the substance to be weighed may be approximately determined before being subjected to the weighing operation upon either of the scales, the index on the rod of the lever P¹ indicating when about the proper weight of material has been loaded upon the scale-pan.

The letter H² represents a rock-shaft, journaled in bearings I² below the base or bed A, provided with angular extensions K², which sit under upright sliding standards L², passing through the bed or base A immediately below the scale-pans, and provided with seats at their upper ends for said scale-pans. The rock-shaft H² is provided with an arm, M², to which is attached a weight or counterpoise, N², which keeps the rock-shaft in a normal position and the standards L² depressed.

O² represents a bent arm, extending from the rock-shaft upward through the side of the column D, and terminating in a knob, P², by means of which the rock-shaft may be operated to elevate the standards L², so as to support the scale-pans.

The scale-pans are identical in construction, so that they may be employed at either side of the scale at pleasure.

The operation of my invention is as follows: When any substance is to be weighed, the parts of the scales are brought into position shown in Fig. 1, with the friction-rollers of the platform-scale fully elevated, so as to support the scale-pans. One of the scale-pans is then loaded with the amount of material to be weighed, after which the shaft and its cams are partially rotated, so as to throw the platform-scale into operative position.

The spring or auxiliary scale forming part of said platform-scale then indicates approximately the weight of material, by means of which the necessary weights for the other pan may be very nearly determined. Said weights are placed upon the scale-pan, and the weight of the material taken by means of the platform-scale, after which the standard of the beam-scale is elevated by a further revolution of the crank, so as to bring said scale into operation, and finally and accurately indicate the weight of the substance.

It will be seen that by my improved invention the weight of the substance is very nearly determined before the beam-scale is brought into play; hence all dragging and shifting of the knife-edges, consequent upon the oscillating of beam in changing the weights to get at an approximate estimate of the weight of the material, is prevented, as the scale-beam is only brought into operation when the weight of material has been determined within a few ounces. This is of the utmost importance in weighing heavy substances, as the drag occasioned upon the knife-edges by the weight of the substance soon breaks the said knife-edges, or wears the bearing-surfaces of the same, so as to render the scale inaccurate and unreliable for delicate work.

I claim—

1. In combination with the platform-scale, an auxiliary or spring scale, whereby the weight of the material may be approximately determined previously to subjecting it to the weighing operation on said scale, substantially as specified.

2. In combination with the standard N, provided with a central slot, M, and side slots A¹ A¹, the slotted portion of the standard E adapted to reciprocate in said central slot, the shaft O, and the eccentric B¹ and R¹, whereby the two standards are simultaneously shifted and thrown into and out of operative position, substantially as specified.

3. In combination with the beam-scale and platform-scale, and the mechanism for throwing the same into and out of operation, the weighted rock-shaft and vertically-sliding standards, whereby the scale-pans may be supported independently of the scale-supports, substantially as specified.

4. In combination with the auxiliary spring-scale on the platform-scale, the index $F^2$ and gage $G^2$ on the standard $D^1$, as and for the purpose set forth.

5. In combination with the beam-scale and platform-scale, and the mechanism for throwing the same into and out of operative position, the rock-shaft and the sliding standards operated thereby for supporting the scale-pans, substantially as and for the purpose specified.

6. In combination with the sliding standard for supporting the beam-scale and the sliding standard for supporting the platform-scale, the transverse shaft passing through the upright column D, and the cams mounted thereon for operating the respective sliding standards, the whole arranged to operate substantially as described.

In testimony that I claim the foregoing I have hereunto set my hand in the presence of the subscribing witnesses.

HENRY S. COCHRAN.

Witnesses:
JAMES L. NORRIS,
JAS. A. RUTHERFORD.